United States Patent [19]

Uemura

[11] Patent Number: 4,788,498
[45] Date of Patent: Nov. 29, 1988

[54] MAGNETIC DETECTOR FOR AN UNMANNED VEHICLE CONTROL SYSTEM

[75] Inventor: Saburo Uemura, Yokohama, Japan

[73] Assignee: Macome Corporation, Tokyo, Japan

[21] Appl. No.: 6,439

[22] Filed: Jan. 23, 1987

[30] Foreign Application Priority Data

| Jan. 28, 1986 [JP] | Japan | 61-16340 |
| Feb. 8, 1986 [JP] | Japan | 61-26225 |
| Nov. 28, 1986 [JP] | Japan | 61-283514 |

[51] Int. Cl.$^4$ ............................................. G01B 7/14
[52] U.S. Cl. ................................... 324/207; 324/253; 324/226; 324/227; 246/187 B; 246/249
[58] Field of Search ............... 324/207, 208, 217, 218, 324/225–228, 232–234, 236, 239, 241, 253, 255, 260, 261, 262, 173, 174; 246/247, 249, 187 B, 77

[56] References Cited

U.S. PATENT DOCUMENTS

| 3,297,866 | 1/1967 | Lippman et al. | 324/208 X |
| 3,562,603 | 2/1971 | Smith | 324/207 X |
| 3,662,257 | 5/1972 | Fujiwara | 324/207 X |
| 3,697,745 | 10/1972 | Bolton | 246/249 |
| 3,855,525 | 12/1974 | Bernin | 324/243 X |
| 3,969,703 | 6/1976 | Wilkas et al. | 246/247 X |
| 3,971,995 | 7/1976 | Eikelberger | 324/166 X |
| 4,140,971 | 2/1979 | Blincoe | 324/208 |
| 4,283,031 | 8/1981 | Finch | 246/247 X |
| 4,368,862 | 1/1983 | Grundy | 246/187 X |
| 4,488,113 | 12/1984 | Heemstra | 324/207 |
| 4,587,486 | 5/1986 | Soyck | 324/207 X |
| 4,603,295 | 7/1986 | Heemstra | 324/207 |
| 4,618,823 | 10/1986 | Dahlheimer et al. | 324/207 |

Primary Examiner—Reinhard J. Eisenzopf
Assistant Examiner—Warren S. Edmonds
Attorney, Agent, or Firm—Bauer & Schaffer

[57] ABSTRACT

A magnetic detector for detecting the magnetic field of a magnetic field generating substance including an even number of saturable coils aligned in a straight line with the distance between adjacent ones larger than the width of the magnetic field generating substance. The saturable coils are separated into at least two pairs, and a high frequency oscillator is provided to supply a high frequency voltage through a resistor circuit to each pair of the saturable coils. A rectifying voltages circuit is arranged across the resistors in a differential manner as an output. When the magnetic field generating substance is displaced over an interval wider than the width thereof relative to the saturable coils, the magnetic detector generates a linear output voltage.

4 Claims, 13 Drawing Sheets

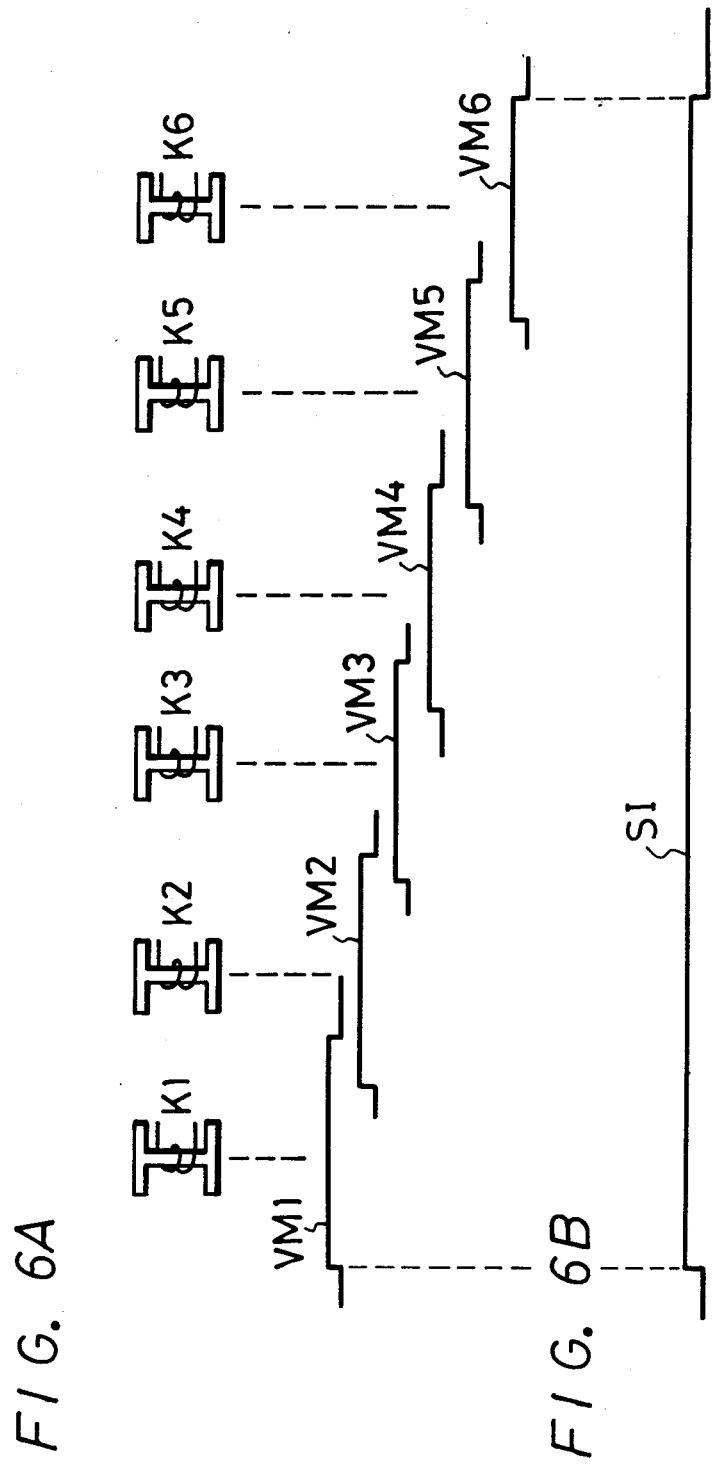

MAGNETIC DETECTOR FOR AN UNMANNED VEHICLE CONTROL SYSTEM

BACKGROUND OF THE INVENTION

1. Field of the Invention

The present invention relates generally to magnetic detectors and, more particularly, is directed to a magnetic detector used to detect a position necessary for stopping vehicles of various kinds such as an elevator, unmanned or driverless train, car or the like at a predetermined position with high accuracy and smoothness and/or to lead an unmanned train and the like.

2. Description of the Prior Art

Generally, in order to position or stop a vehicle, various kinds of contactless switches are used to detect a stop position and a position before the stop position and on the basis of these detected positions, the vehicle is decelerated and then stopped at the predetermined stop position.

Another method for stopping the vehicle at the predetermined stop position, is proposed, which employs a multiplex magnetic detecting switch which detects a magnet plate located at the stop position of the vehicle and then produces an output changing stepwise before and after the stop point (see Japanese patent application No. 59-241738).

It is known to lead an unmanned train or car by an electromagnetic guidance system which uses an electric wire buried in the floor and a detecting coil mounted on the unmanned train or an optical system in which a white tape attached to the floor is detected by a photosensor. As other method, there is proposed a magnetic guide system in which a belt-shaped rubber magnet is attached on the floor and the position of this rubber magnet is detected by the multiplex magnetic detecting switch located on the unmanned or driverless train to thereby carry out the pilot control of the unmanned train (see also Japanese patent application No. 59-241738).

Since the above mentioned multiplex magnetic detecting switch produces a step-shaped control voltage, this switch has a problem in continuous servo control for the unmanned train. Further, in order to detect a range as wide as 300 mm, it is necessary to use several 10s magnetic detecting switches. Thus, a circuit arrangement of a magnetic detector becomes complicated in construction and becomes high in cost.

It is known to produce a non-contact type potentiometer by combining a magnetic generator and a magnetic detector. In the prior art system, the magnetic generator must be provided over the entire region in which the potentiometer is changed and also the magnitude of the magnetic flux from the magnetic generator has to be altered with the place in order to produce a linear output. Accordingly, the prior art non-contact type potentiometer is not suited as a magnetic detector used to lead an unmanned train or the like.

OBJECTS AND SUMMARY OF THE INVENTION

Accordingly, it is a general object of this invention to provide an improved magnetic detector.

An object of this invention is to provide a magnetic detector which can be used widely as a kind of scale or potentiometer.

Another object of this invention is to provide a magnetic detector which can be used as a velocity detector.

Still another object of this invention is to provide a magnetic detector which can be used as a detector for leading an unmanned or driverless train or the like.

Yet another object of this invention is to provide a magnetic detector which can be used to control the stop position of an unmanned vehicle such as a stacker crane, an elevator, an unmanned train or the like accurately and smoothly.

A further object of this invention is to provide a magnetic detector in which a length of a linear portion of an output voltage signal therefrom can be made sufficiently longer than the width of the magnetic field generating substance.

A further object of this invention is to provide a magnetic detector which can be prevented from being affected by a positional displacement.

A further object of this invention is to provide a magnetic detector which can produce an output voltage of a desired function form by increasing the number of saturable coils.

Still further object of this invention is to provide a magnetic detector in which a cross section of a belt-shaped rubber magnet can be made small so that the track can be made at low cost.

Still further object of this invention is to provide a magnetic detector which can control the running state of the unmanned or driverless train positively and highly accurately by an analog servo.

Yet further object of this invention is to provide a magnetic detector by which even at the branching or joining point of the track, an unmanned or driverless train or the like can be shifted right or left arbitrarily without breaking the track.

According to one aspect of the present invention, there is provided a magnetic detector comprising:

(a) a magnetic field generating substance;

(b) saturable coils of an even number aligned on a straight line with a distance between adjacent ones larger than a width of said magnetic field generating substance, said saturable coils being separated into at least two pairs;

(c) a high frequency oscillator for supplying a high frequency voltage through resistors to each pair of saturable coils; and (d) means for rectifying voltages generated across said resistors in a differential manner as an output, wherein when said magnetic field generating substance is displaced over an interval wider than the width thereof relative to said saturable coils, said magnetic detector generates a linear output voltage.

These and other objects, features and advantages of the present invention will become apparent from the following detailed description of the preferred embodiments of the invention that is to be read in conjuction with the accompanying drawings, in which like reference numerals identify like elements and parts.

BRIEF DESCRIPTION OF THE DRAWINGS

FIG. 6A is a diagram showing output voltages generated from the magnetic switches shown in FIG. 5;

FIG. 6B is a diagram showing an example of an interval signal generated from the magnetic switching circuit;

DESCRIPTION OF THE PREFERRED EMBODIMENTS

Now, the present invention will hereinafter be described in detail with reference to the attached drawings.

Figure 1:
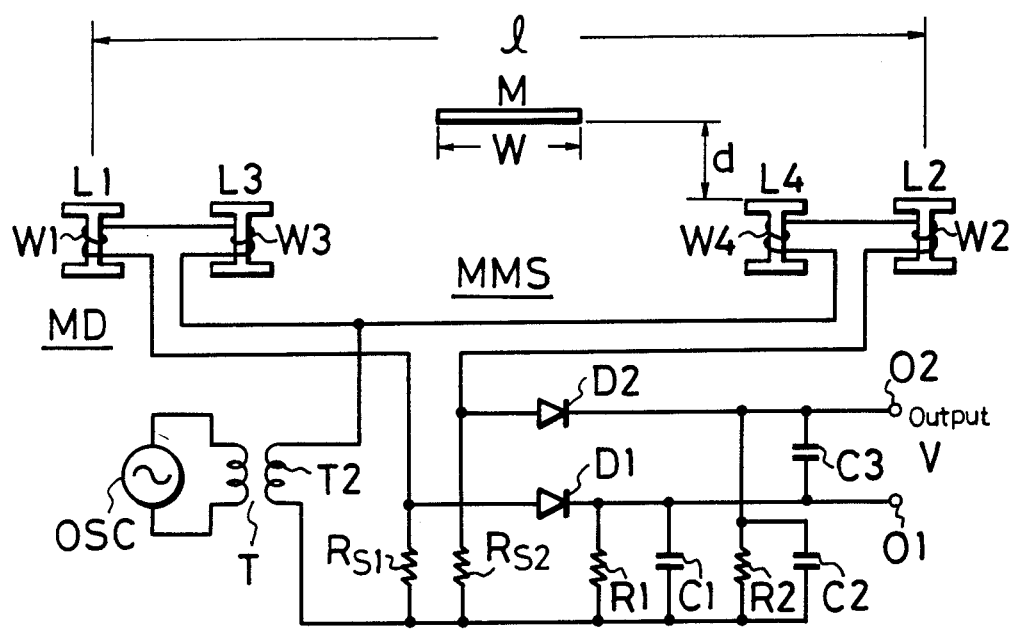
FIG. 1 is a circuit diagram showing a fundamental embodiment of a magnetic detector according to the present invention.

FIG. 1 is a circuit diagram showing a fundamental embodiment of a magnetic detector MD according to the present invention.

Referring to FIG. 1, saturable coils L1, L2, L3 and L4 constitute a multiplex magnetic sensor MMS. Each of the saturable coils L1, L2, L3 and L4 is formed of an I-shaped permalloy core and a winding wound therearound. In this case, the sensitivity of the magnetic detector MD is changed with the thickness and the shape of the permalloy core. In this embodiment, the permalloy core, which is 5 mm in height, 4 mm in width and 0.05 mm in thickness, is used. One saturable coil is made by winding a wire around the above core 200 turns and another saturable coil is made by winding a wire around the same core 100 turns. In FIG. 1, the saturable coils L1 and L2 each have 200 turns of the winding, while the saturable coils L3 and L4 each have 100 turns of the winding. A high frequency oscillator OSC is adapted to generate a high frequency (for example, 50 kHz) whose pulse width is selected to be, for example, 1 μs. In FIG. 1, reference numerals $R_{S1}$ and $R_{S2}$ designate series resistors (for example, 300 Ω), D1 and D2 diodes, R1 and R2 output resistors, C1, C2 and C3 smoothing capacitors and M a magnetic field generating substance such as a magnet, a rubber magnet and so on.

In the illustrative embodiment in FIG. 1, the saturable coils L1, L2, L3 and L4 are located on the same straight line and the saturable coils L1 and L3 are paired and the saturable coils L2 and L4 are paired. Windings W1 and W3 of the first paired saturable coils L1 and L3 are connected in series, while windings W2 and W4 of the second paired coils L2 and L4 are also connected in series. The spacings or gaps between the saturable coils L1 and L3 and between the saturable coils L2 and L4 are selected respectively to be substantially equal to or larger than a width W of the magnetic field generating substance M. The free ends of the windings W3 and W4 of the saturable coils L3 and L4 are connected together to one end of a secondary winding T2 of a transformer T of the oscillator OSC. While, the free end of the winding W1 of the saturable coil L1 is connected through the series resistor $R_{S1}$ to the other end of the secondary winding T2 of the transformer T and the free end of the winding W2 of the saturable coil L2 is connected similarly through the series resistor $R_{S2}$ to the other end of the secondary winding T2 of the transformer T of the oscillator OSC. The junction between the winding W2 and the series resistor $R_{S2}$ is connected through the diode D2 to an output terminal 02, while the junction between the winding W1 and the series resistor $R_{S1}$ is connected through the diode D1 to the other output terminal 01. A parallel circuit formed of a capacitor C1 and the resistor R1 is connected between the output side of the diode D1 and the other end of the series resistor $R_{S1}$, while a parallel circuit formed of a capacitor C2 and the resistor R2 is connected between the output side of the diode D2 and the other end of the series resistor $R_{S2}$. Further, a capacitor C3 is connected between the first and second output terminals 01 and 02.

When the magnetic field generating substance M approaches the saturable coils (forming the multiplex magnetic sensor MMS) L1 to L4 aligned on the line, the core of the corresponding saturable coil is saturated and a voltage produced at the output side of the diode D1 or D2 connected to the corresponding saturable coil is increased. Since the gap between the paired coils L1 and L3 and that between the coils L2 and L4 are selected to be larger than the width W of the magnetic field generating substance M, a peak-shaped voltage is generated each time the magnetic field generating substance M passes through each of the coils L1 to L4. Accordingly, the first paired coils L1 and L3 generate a positive voltage, while the second paired coils L2 and L4 generate a negative voltage. The magnitude of the voltage depends on the number of turns of the winding and the position at which the peak voltage is generated is determined by the position of each coil. So, when the number of turns of the winding and the position of the coils L1 to L4 are selected properly, it is possible to obtain an output voltage which has a linear inclination over a wide range.

In this embodiment, as the magnetic field generating substance M, there is used a rubber magnet whose width w in its movable direction is selected to be 50 mm and whose thickness is selected as 0.8 mm. In the case of the unmanned vehicle guide, the magnetic field generating substance M becomes several 10s meters in its longitudinal direction. The magnetic field generating substance M 100 mm long was used in the experiments.

Figure 3:
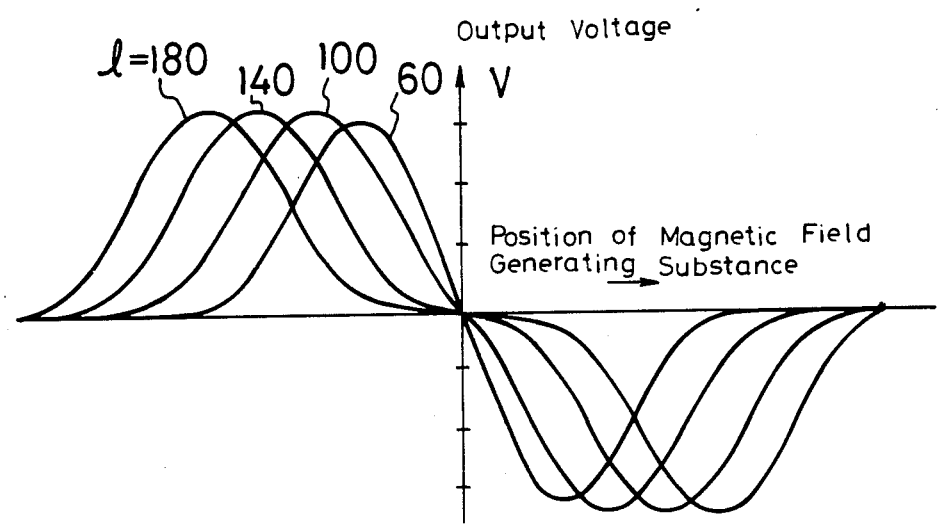
FIG. 3 is a graph of an output voltage used to explain a principle of the present invention.

FIG. 3 is a graph of an output voltage V used to explain the principle of the present invention where in FIG. 1 the coils L3 and L4 are removed, only the coils L1 and L2 are used and the spacing or gap l between the coils L1 and L2 is changed as 60 mm, 100 mm, 140 mm and 180 mm, respectively.

FIG. 3 illustrates an output voltage V generated when the distance or gap d between the magnetic field generating substance M and the magnetic sensor MMS of the magnetic detector MD or the saturable coils L1 and L2 is kept to be 30 mm (constant value) and the magnetic field generating substance M is moved along the direction of its width w.

According to the graph of FIG. 3, when the gap l is selected to be 60 mm, the output voltage V changes with a linear inclination in the interval of 40 mm and the spacing between the peak and the trough is 60 mm, which is equal to the gap l. When the gap l is selected to be 100 mm, the output voltage V is changed with a substantially linear inclination in the interval of 70 mm but the central portion of the straight line is curved very slightly.

When the spacing l is selected as 140 mm and 180 mm respectively, the output voltages V are separated into the peak of the positive voltage side and the peak of the negative voltage side, completely and the central portions thereof are presented as non-linear portions considerably. In this case, the distance between the peaks of each output voltage V is equal to the gap l.

The magnitude of the output voltage V is related to the spacing d between the magnetic field generating substance M and the magnetic sensor MMS of the detector MD and in this embodiment, the peak value of the output voltage V is ±3V when the distance d is selected to be 30 mm. At that time, the magnetic field generated from the magnetic field generating substance M at the place which is in front thereof and distant therefrom by 30 mm is 8 gausses. From this measured result, it can be understood that the magnetic detector MD of this embodiment is very high in sensitivity.

When the linear change region of the output voltage V covers the area as wide as about 1.5 times the width w of the magnetic field generating substance M, it is possible to obtain the magnetic detector MD of the invention by properly positioning the two saturable coils L1 and L2. However, when a linear change region of the output voltage V over the wide regions as described above is required, as shown in FIG. 1, other saturable coils L3 and L4 must be provided between the saturable coils L1 and L2 so as to correct the curved portion of the central portion shown in the curve of the output voltage V.

Figure 4:
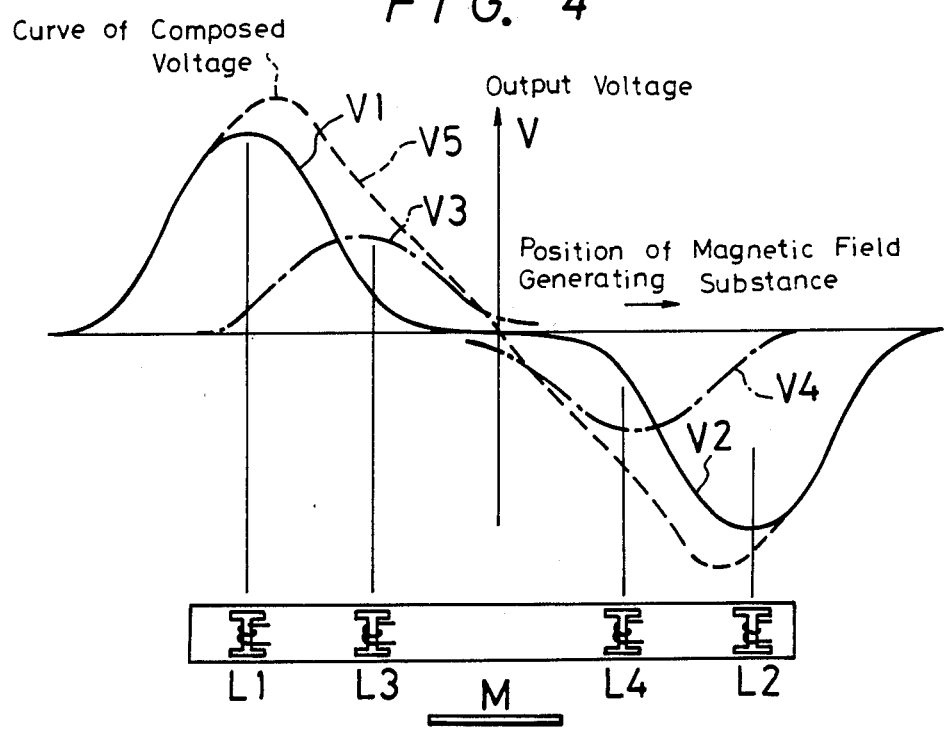
FIG. 4 is a graph of an output voltage used to explain a principle of correcting a curve of a central portion of an output voltage curve characteristic.

FIG. 4 is a graph and diagram showing the above principle.

In FIG. 4, reference numerals V1 and V2 designate respectively output voltages generated from the magnetic detector MD on the basis of the curve presented when the spacing l is selected as 180 mm in FIG. 3, that is, on the basis of the saturable coils L1 and L2 placed with the gap of 180 mm therebetween. Reference numerals V3 and V4 designate respectively output voltages generated from the saturable coils L3 and L4 that are positioned between the saturable coils L1 and L2 with the spacing of 90 mm. In this case, the turns of the winding of each of the saturable coils L3 and L4 are reduced as compared with that of the coils L1 and L2 in order to decrease the output voltages to the half. A composed voltage curve V5 presented by adding the respective curve voltages V1, V2, V3 and V4 becomes an output voltage curve as an output voltage of the magnetic detector MD and this output voltage curve V5 becomes linear over a considerably wide range.

Similarly, when the number of the saturable coils is increased, it becomes possible to obtain a magnetic detector MD which produces a linear output voltage over a wider range.

Figure 2:
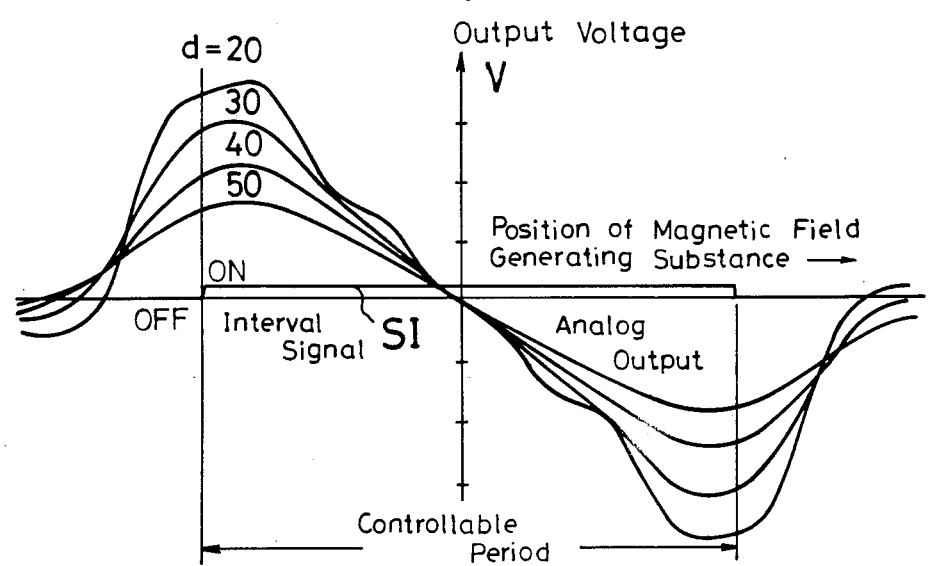
FIG. 2 is a graph of an output voltage used to explain the present invention.

FIG. 2 is a graph graphing an output voltage generated when the four saturable coils L1, L2, L3 and L4 are positioned such that as shown in the circuit of FIG. 1, the coils L3 and L4 are located at the positions distant from the center by ±45 mm and the coils L1 and L2 are located at the positions distant from the center by ±90 mm. From the graph of FIG. 2, it should be appreciated that when the gap or distance d between the magnetic field generating substance M and the magnetic sensor MMS of the magnetic detector MD is equal to or larger than 30 mm, the output voltage V presents the linear change in a range of about 150 mm. When the unmanned vehicle is moved over a wide range, the range that the magnetic detector MD of the invention can detect is limited. So, in general, in addition to the analog output signal V necessary for the control operation in the limited range, it becomes necessary to provide an on-off interval signal which indicates the interval of such control operation. FIG. 2 illustrates also an interval signal SI that is generated from a magnetic switch incorporated in the unmanned or driverless vehicle together with the magnetic detector MD which generates the analog output signal V.

Figure 5:
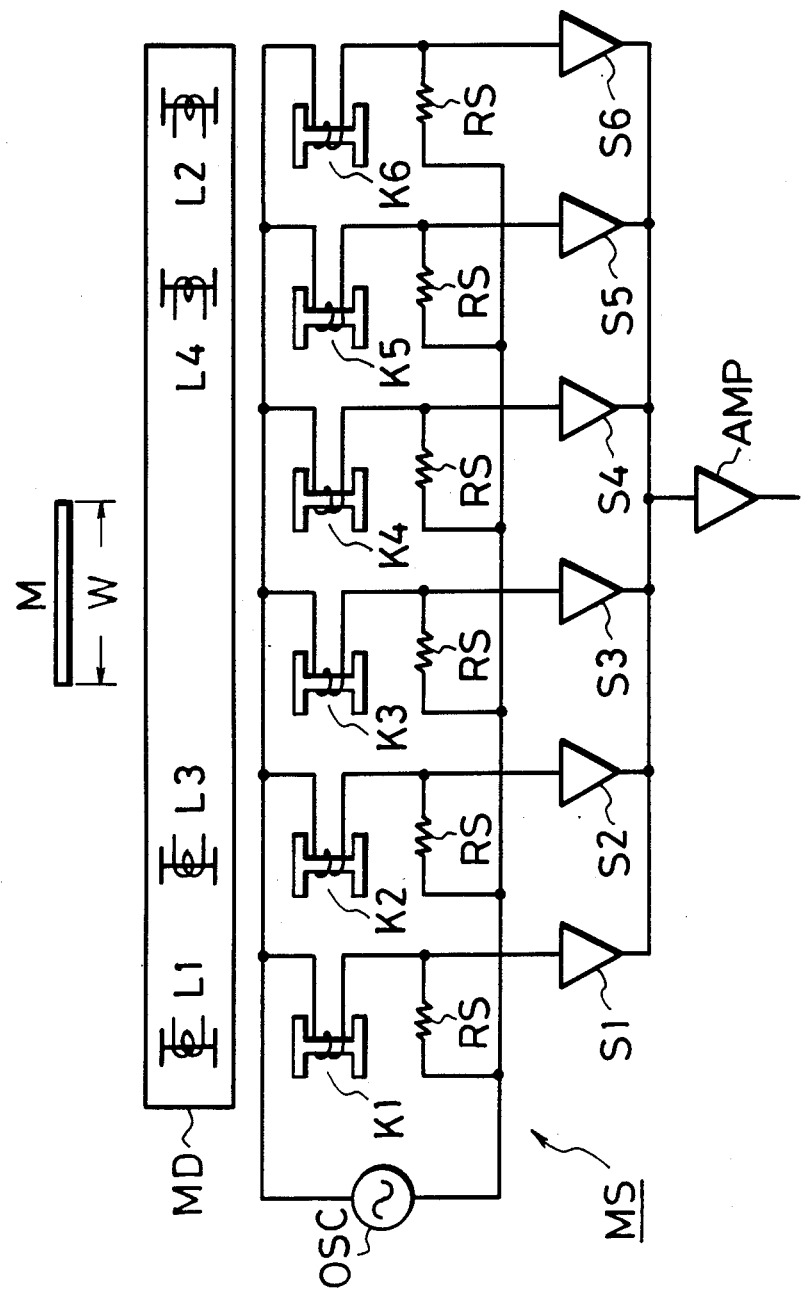
FIG. 5 is a circuit diagram showing another example of the magnetic detector according to the present invention which includes a magnetic switching circuit.

FIG. 5 is a circuit diagram showing an example of a magnetic switch circuit MS which generates the above mentioned interval signal SI. Referring to FIG. 5, there are provided saturable coils K1, K2, ... K6 respectively which become magnetic sensing elements of the magnetic switch circuit MS. Each of the saturable coils K1, K2, ... K6 is formed of an I-shaped permalloy core and a winding wound therearound. In this case, the sensitivity of each of the magnetic sensing elements K1 to K6 changes dependent on the thickness and the shape of the permalloy core of the saturable coil. In this embodiment, each of the saturable coils or magnetic sensing elements K1 to K6 has 200 turns of a wire wound around the permalloy core which is 5 mm in height, 4 mm in width and 0.03 mm in thickness. The saturable coils K1 to K6 are substantially the same as those coils L1 and L2 except the thickness of the core. There is provided a high frequency oscillator OSC which generates a high frequency (for example, 500 kHz). A series resistor RS is connected between the high frequency oscillator OSC and each of the saturable coils K1 to K6. Magnetic switches S1 to S6 are respectively connected to the output sides of the magnetic sensing elements K1 to K6 and an amplifier AMP is connected commonly to the output sides of the magnetic switches S1 to S6. This amplifier AMP is provided with an OR gate. In this embodiment, the saturable coils K1, K2, . . . K6 are aligned on the same straight line as the straight line on which the saturable coils L1, L2, L3 and L4 constituting the magnetic detector MD which generates the analog output voltage V are aligned. The spacing or distance between adjacent ones of the saturable coils K1, K2, . . . K6 is selected to be substantially 30 mm. This distance is selected to be a little smaller than the width w (50 mm in this case) of the magnetic field generating substance M.

FIG. 6A is a diagram showing output voltages VM1, VM2, . . . VM6 of the magnetic switches S1 to S6. When the magnetic field generating substance M arrives at the front of the saturable coil K1, the magnetic switch S1 is turned on. So, as the magnetic field generating substance M is moved, the magnetic switches S2, . . . S6 are turned on, sequentially. The amplifier AMP is turned on over the whole period in which the magnetic switches S1 to S6 are operated or turned on and generates such an interval signal SI as shown in FIG. 6B. While the magnetic switch using one saturable coil is operated only within a range to which the magnetic field of the magnetic field generating substance M can be applied, if a large number of magnetic switches S1 to S6 are arranged with a proper spacing between adjacent ones and their outputs are calculated logically by the OR circuit of the amplifier AMP as described above, it becomes possible to obtain an interval detecting circuit or magnetic switch circuit MS which is operated in a range much wider than the width w of the magnetic field generating substance M. In the example shown in FIG. 5, there are provided 6 magnetic switches S1 to S6 so that the interval detecting circuit MS can be operated in the interval of 180 mm.

Subsequently, the embodiment of the magnetic detector MD according to the present invention in use will be described hereinafter.

Figure 7:
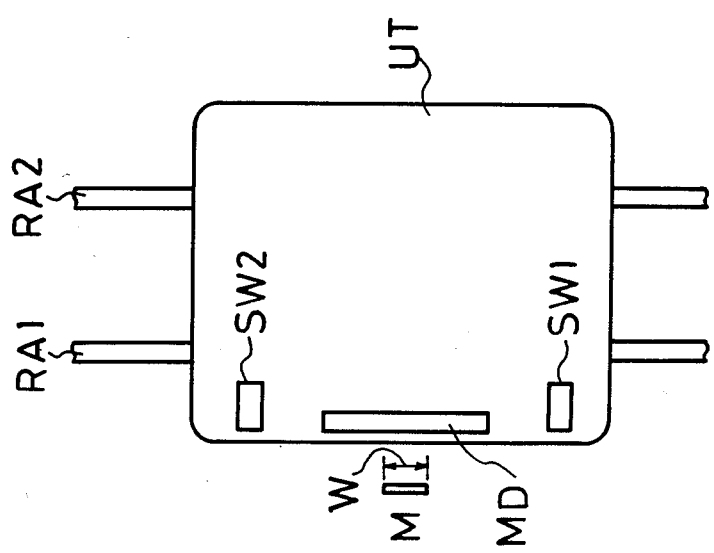
FIG. 7 is a plan view of a stacker crane to which the present invention is applied.

FIG. 7 is a plan view of an unmanned or driverless train UT such as a stacker crane used in an automated warehouse. In this example, the magnetic detector MD including the magnetic switch circuit MS of the invention shown in FIG. 5 is used to control such unmanned train UT. Referring to FIG. 7, the magnetic field generating substance M is attached to one portion of a rack (not shown) in the warehouse. A rubber magnet whose width w in its movable direction is 50 mm, whose length is 100 mm and whose thickness is 1.6 mm is used as the magnetic field generating substance M. The unmanned train UT movable along a pair of rails RA1 and RA2 is provided with the magnetic detector MD of the invention at its side wall which approaches the magnetic field generating substance M. While, magnetic contactless switches SW1 and SW2 each of which is high in sensitivity are provided respectively at the positions distant from the magnetic detector MD by 300 mm. When the unmanned train UT is moved, for example, from the upper edge to the lower edge in the sheet of drawing, the magnetic contactless switch SW1 senses the magnetic field generating substance M and is turned on, initially. Accordingly, the unmanned train UT begins to decelerate so as to stop. When the unmanned train UT advances about 300 mm, the interval signal SI from the magnetic switch circuit MS of the magnetic detector MD is turned on so that through the analog control operation, the unmanned train UT is stopped at the stop point at which the output voltage V of the magnetic detector MD becomes zero. The spacing or distance between the magnetic field generating substance M and the magnetic detector MD, the spacing between the magnetic field generating substance M and the switch SW1 and the spacing between the magnetic field generating substance M and the switch SW2 are each selected to be 50 mm, which is wide enough for the detecting circuit MD and so on to operate even when the unmanned train UT wobbles. Further, since the interval in which the analog control operation is carried out to stop the unmanned train UT is selected to be ±90 mm, it is possible to stop the unmanned train UT smoothly by the continuous deceleration.

The magnetic detector MD including the magnetic switch circuit MS of the invention is not limited to the control of the stacker crane but the invention is very effective for servo-controlling the elevator and the unmanned vehicle movable on the floor so as to be stopped at the predetermined position.

Figure 8:
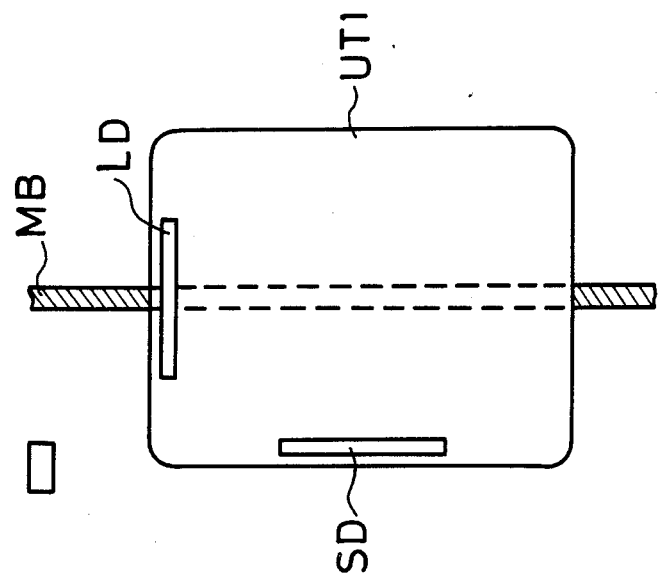
FIG. 8 is a plan view used to control a track of an unmanned train to which the present invention is applied.

FIG. 8 is a plan view illustrating an example in which the magnetic detector of the invention is used to control an unmanned or driverless vehicle UT1. In the illustrative example, a belt-shaped rubber magnet 50 mm wide and 0.8 mm thick is attached on the floor surface as a magnetic belt MB along which the ummanned vehicle UT1 is moved or guided. Although the unmanned vehicle UT1 includes a wheel driving section and a control section, only a magnetic detector LD used to detect the track deviation and a magnetic detector SD used to control the stop operation of the unmanned train UT1 are illustrated in FIG. 8. In this case, each of the magnetic detectors LD and SD are substantially same as that shown in FIG. 5.

The track position detector LD is attached to the unmanned vehicle UT1 at a distance of 30 mm from the floor surface and in the direction perpendicular to the longitudinal direction of the magnetic belt MB. When the unmanned vehicle UT1 is at the correct position on the belt MB, the analog output voltage V of the detector LD becomes a zero voltage of the central position. When the unmanned vehicle UT1 is displaced sideways in the right-hand or the left-hand direction from the correct or center position relative to the belt MD, the detector LD generates a positive voltage or negative voltage V in proportion to the displaced amount of the unmanned vehicle UT1. So, if the analog output voltage V of the detector LD is supplied to the steering control apparatus (not shown) of the unmanned vehicle UT1 and then the unmanned vehicle UT1 is servo-controlled, it becomes possible to move the unmanned vehicle UT1 correctly on the track or belt MB. If the unmanned vehicle UT1 is displaced for some reason from the correct track or belt MB by an amount over ±90 mm, the interval signal SI of the interval detecting circuit or magnetic switch circuit MS incorporated in the detector LD becomes off to generate an alarm signal.

Since the saturable coils in the detectors LD and SD are operated by the high frequency voltage from the oscillator OSC, the magnetic detector and the interval detecting circuit are high in response speed and the maximum response frequency thereof is higher than 4 kHz.

According to the present invention as set forth above, there can be achieved various kinds of remarkable effects.

Since the magnetic detector of the invention can detect the position of the magnetic field generating substance which is moving (vice versa) in a non-contact manner, the magnetic detector of the invention can be used as a kind of scale or potentiometer in a general use.

Since the output voltage of the magnetic detector is perfectly continuous and has substantially no time delay for the displacement of the relative position between its magnetic sensor and the magnetic field generating substance, the magnetic detector of the invention is combined with a differentiating circuit and can be used as a velocity detector.

Since the spacing or gap between the magnet or magnetic field generating substance and the magnetic detector can be increased by using the saturable coil which is high in sensitivity, the magnetic detector of the invention is very suitable as the magnetic detector used to lead the unmanned vehicle along the belt of the rubber magnet laid on the floor surface.

Further, since the magnet is fixed to the floor or wall at the position indicating the stop position of the unmanned vehicle, it is possible to control the stop position of the unmanned vehicle such as the stacker crane, the elevator or the like.

Further, the length of the linear portion of the output voltage signal from the magnetic detector can be made sufficiently larger than the width of the magnetic field generating substance in response to the control purpose.

Furthermore, since the magnetic detector which generates the analog output voltage changing rectilinearly is combined with the interval detecting circuit which limits the controllable interval, it can always check if the unmanned vehicle is positioned within the controllable interval.

In addition, the magnetic detector of the invention is simple in circuit arrangement and high in response speed.

Figure 9:
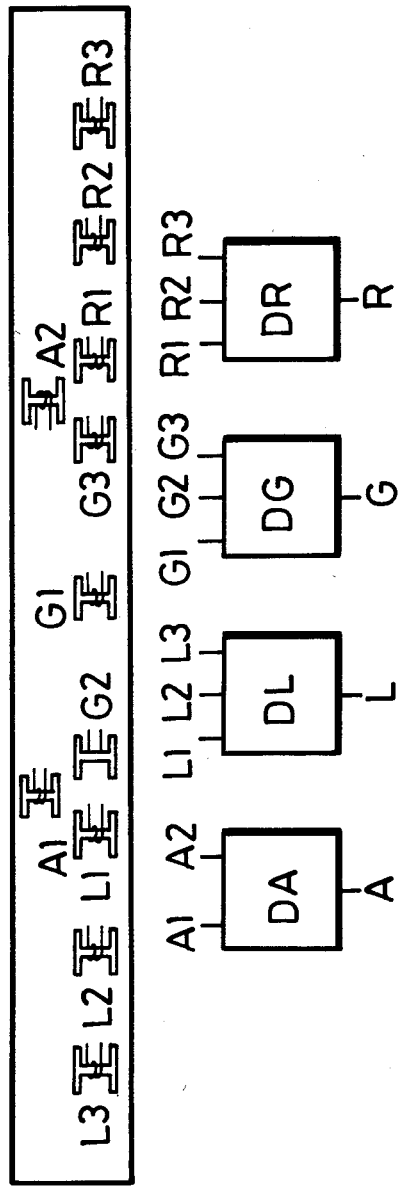
FIG. 9 is a schematic representation showing other example of the magnetic detector according to the present invention.

FIG. 9 is a schematic representation showing a circuit arrangement of other embodiment of the magnetic detector according to the present invention used as a track transportion control detector (hereinafter simply referred to as a detector) MD1 for an unmanned or driverless vehicle. Similarly to the above mentioned embodiment, the magnetic field generating substance M is formed of a belt-shaped rubber magnet for track and which is attached on the floor surface in use as in the former embodiment. As this belt-shaped rubber magnet, there is employed a rubber magnet of 0.8 mm thick whose width w is 50 mm. This rubber magnet is laid all over the interval in which the unmanned vehicle is moved.

In FIG. 9, reference numerals A1, A2, L1, L2, L3, G1, G2, G3, R1, R2 and R3 all designate saturable coils each of which is high in sensitivity. Each of these saturable coils is formed of an I-shaped permalloy core which has 200 turns of a wire wound therearound. The magnitude of the operable magnetic field changes dependent on the shape and the dimension of the permalloy core. In this embodiment, the permalloy core is 4 mm wide, 5 mm high and 0.05 mm thick.

The respective coils A1, A2, L1, L2, L3, G1, G2, G3, R1, R2 and R3 are aligned on the straight line and illustrated schematically for better understanding in FIG. 9. However, in practice, the gap between the saturable coils A1 and A2 is selected as 100 mm, the gap between the saturable coils G2 and G3 is selected as 70 mm, the gap between the saturable coils R1, R3 and L1, L3 is selected as 70 mm and the gap between the saturable coils L1 and R1 is selected as 90 mm. A magnetic sensor circuit DA is connected with the saturable coils A1 and A2 and adapted to generate at its output terminal an analog output voltage A. Switching circuits DG, DL and DR are connected respectively with three saturable coils G1, G2, G3; L1, L2, L3; and R1, R2, R3 and adapted to detect the position of the magnetic field generating substance M to thereby generate on-off signals G, L and R, respetively. In this case, of the four outputs A, L, G and R from the magnetic sensor circuit DA and the switching circuits DL, DG and DR of the detector MD1, the first output A is the analog output from the magnetic sensor circuit DA and has a substantially linear inclination presented at the central portion thereof; the second output G is the first on-off signal from the magnetic sensor circuit DG and used to confirm the slanted interval of the second analog output A; the third output R is the second on-off signal from the magnetic sensor circuit DR and used to detect that the unmanned vehicle is shifted over the inclined interval of the analog output A in the right-hand side direction; and the fourth output L is the third on-off signal from the magnetic sensor circuit DL and used to detect that the unmanned vehicle is shifted over the inclined interval of the third analog output A in the left-hand side direction (refer to FIG. 14).

Figure 10:
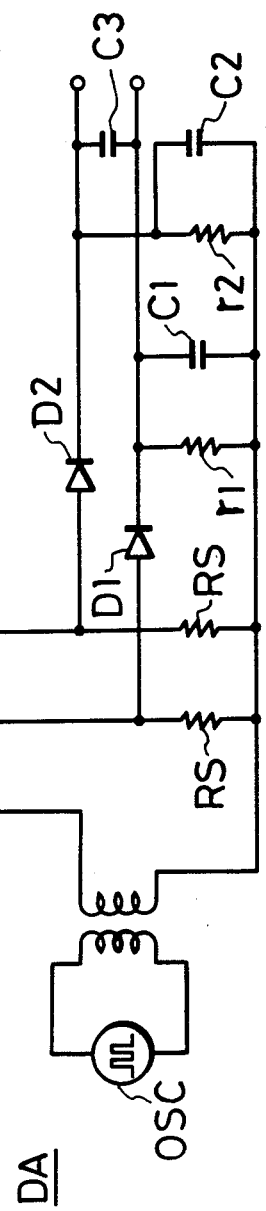
FIG. 10 is a circuit diagram showing in detail a magnetic sensor circuit used in the invention.

FIG. 10 is a circuit diagram similar to the circuit diagram of FIG. 1 and shows in detail the magnetic sensor circuit DA which is connected with the saturable coils A1 and A2 to thereby produce the analog output A. A pulse oscillator OSC is adapted to generate a high frequency pulse (for example, 50 kHz) whose pulse width is selected as, for example, 1 μs. In FIG. 10, reference letter RS denotes a series resistor, D1 and D2 denote diodes, r1 and r2 denote the output resistors and C1, C2 and C3 denote capacitors.

Figure 11:
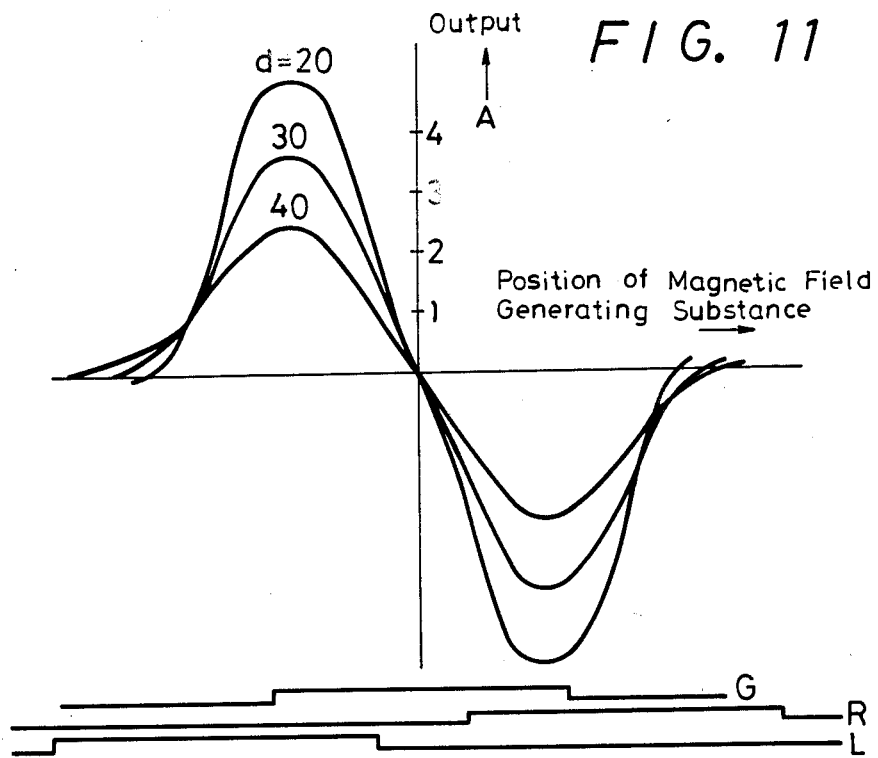
FIG. 11 is a graph graphing an output characteristic of the magnetic detector.

The detector MD1 is located at the position distant from the magnetic field generating substance M by 20 mm to 40 mm. So, when the magnetic field generating substance M is moved in its width W direciton, the magnetic sensor circuit DA of the detector MD1 generates the analog output A which has a lineally inclined portion at the center thereof as shown in FIG. 11. In the graph of FIG. 11, reference letter d designates a distance between the magnetic field generating substance M and the detector MD1. In the analog output A, the length of the linear portion is substantially 70 mm and the spacing between the peak and the trough is 100 mm as same as the gap between the saturable coils A1 and A2. The magnetic field generating substance M has a cross section which is 50 mm wide and 0.8 mm thick and it is magnetized uniformly in its thickness direction. The intensity of the magnetic field measured at the position distant from the central portion of the magnetic field generating substance M by 30 mm is 8 gausses.

Figure 12:
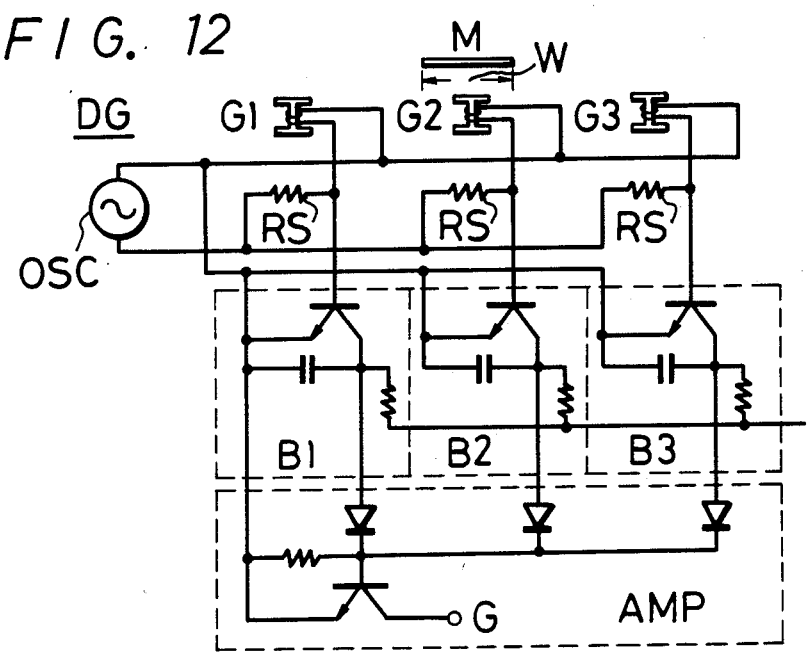
FIG. 12 is a circuit diagram showing in detail a switching circuit used in the magnetic detector shown in FIG. 9.

FIG. 12 is a circuit diagram showing in detail the switching circuit DG connected with the three saturable coils G1, G2 and G3 and which generates the first on-off signal G. In this circuit arrangement, an AC voltage with high frequency (for example, 500 kHz) from the high frequency oscillator OSC is supplied through the resistor RS to the saturable coils G1, G2 and G3. When the magnetic field generating substance M approaches these saturable coils G1, G2 and G3, the cores of these saturable coils G1, G2 and G3 are saturated respectively and the voltages across these coils G1, G2 and G3 are decreased. The changes of the voltages across the saturable coils G1, G2 and G3 are converted respectively to direct currents by rectifying circuits Bl, B2 and B3 and then fed to the amplifier AMP. This amplifier AMP is formed by combining the OR circuit and the amplifying circuit and the output signal G therefrom is turned on in the interval where any one of the saturable coils G1, G2 and G3 is saturated by the magnetic field generating substance M. In this embodiment of FIG. 9, when the gap between the saturable coils G2 and G3 is selected to be 70 mm and the width W of the magnetic field generating substance M is selected to be 50 mm, the interval in which the output signal G is turned on becomes about 100 mm. This length substantially coincides with the spacing between the peak and the trough of the analog output signal A. Other switching circuits DL and DR are constructed substantially similar to that shown in FIG. 12 and has an operation interval of substantially 100 mm.

FIG. 11 illustrates the output signals G, L and R in addition to the output signal A. The switching circuits DG, DL and DR are turned on respectively under the magnetic field of about 5 gausses in this embodiment. In the case where the rubber magnet whose width is 50 mm and whose thickness is 0.8 mm is used as the magnetic field generating substance M, the magnetic field at the position distant from the magnetic field generating substance M by 30 mm becomes 8 gausses but the magnetic field at the position distant from the magnetic field generating substance M by 40 mm becomes 5 gausses. Accordingly, in this embodiment, the respective switching circuits DG, DL and DR are used with the gap from the substance M less than 40 mm.

Figure 13:
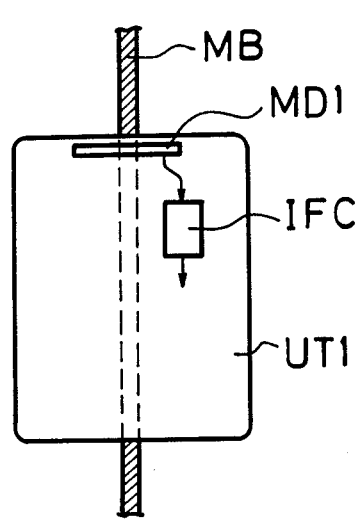
FIG. 13 is a plan view illustrating an example of a guidance system for an unmanned or driverless train to which the present invention is applied.

FIG. 13 is a plan view showing an example in which the above mentioned detector MD1 is used to guide the unmanned vehicle UT1 along the track. In the case shown in FIG. 13, a belt MB made of a rubber magnet which is 50 mm wide and 0.8 mm thick in cross section is laid on the floor surface and the unmanned vehicle UT1 is controlled so as to be moved along this belt-shaped rubber magnet MB. Although it is needless to say that the unmanned vehicle UT1 includes a wheel drive section, a control section and so on, in FIG. 13, there are shown only the detector MD1 and an interface circuit IFC for simplicity. This detector MD1 functions as described before and is very high in sensitivity. When the detector MD1 is mounted on the unmanned vehicle UT1 distant from the floor surface or magnetic belt MB by 30 mm, this detector MD1 can operate normally even if the spacing from the floor surface is changed from 20 mm to 40 mm.

Figure 14:
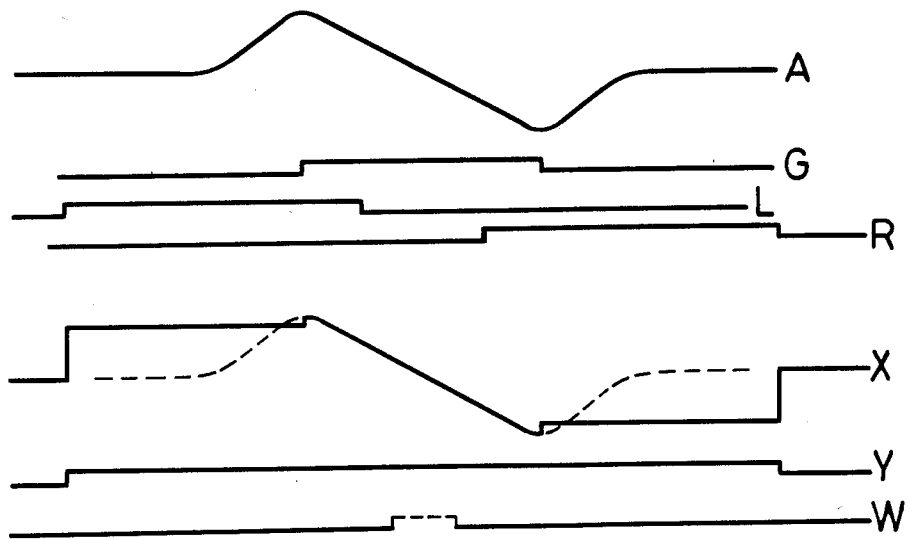
FIG. 14 is a diagram used to explain a function of an interface circuit used in FIG. 13.

FIG. 14 is a representation used to explain the function of the interface circuit IFC in which the four signals A, G, L and R as the output signals from the detector MD1 are processed properly and thereby generated as signals X, Y and W which are suitable for the control operation of the unmanned vehicle UT1. The signal X is an output signal from the interface circuit IFC which results from adding constant voltages near the peak values of the signal A to the outside of the slanted portion (interval in which the signal G is turned on) of the signal A during the periods of the signals L and R. The signal Y is the switching signal which turns on during the period formed of the ON periods of the signals G, L and R ((G+L+R) in logical expression). If, with respect to the belt-shaped rubber magnet MB, the unmanned vehicle UT1, lies within the ON period of the signal Y, the unmanned vehicle UT1 is located within ±150 mm from the track or belt MB so that the unmanned vehicle UT1 is track-controlled. If the unmanned vehicle UT1 is outside the ON period of the signal Y, this is regarded as the accident or reckless driving of the unmanned vehicle UT1 and the alarm signal can be generated. When the signal X is applied to the steering controller (not shown) of the unmanned vehicle UT1 as a servo control signal, if the unmanned vehicle UT1 stays within the ON period of the signal Y, the unmanned vehicle UT1 can be led to the center of the track by the servo control operation.

Referring to FIG. 14, the signal W is the switching signal which is turned on during the period in which the signals L and R are turned on simultaneously (L×R) and which is generated when the width of the belt-shaped rubber magnet MB as the track is increased at the point at which the track is branched or the two branched tracks are joined. The signal W is used to carry out the branching control which will be described next. Under the state of the signals L and R shown in FIG. 14, the signal W is not generated so that it is illustrated by a broken line in FIG. 14.

Figure 15:
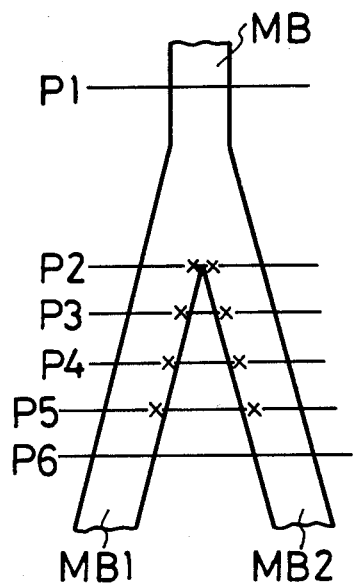
FIG. 15 is a plan view showing an example of a track for the unmanned train near a branching point.

FIG. 15 is a plan view illustrating the track or belt MB near the branching point. As shown in FIG. 15, at a position P1, the rubber magnet belt MB is 50 mm wide, while at the branching position P2, the width of the rubber magnet belt MB is widened to 100 mm. At positions P3, P4, P5, . . . , the track or belt MB is divided into two tracks or belts MB1 and MB2 and gaps between the two tracks MB1 and MB2 are respectively 20 mm, 40 mm, 60 mm . . .

Figure 16:
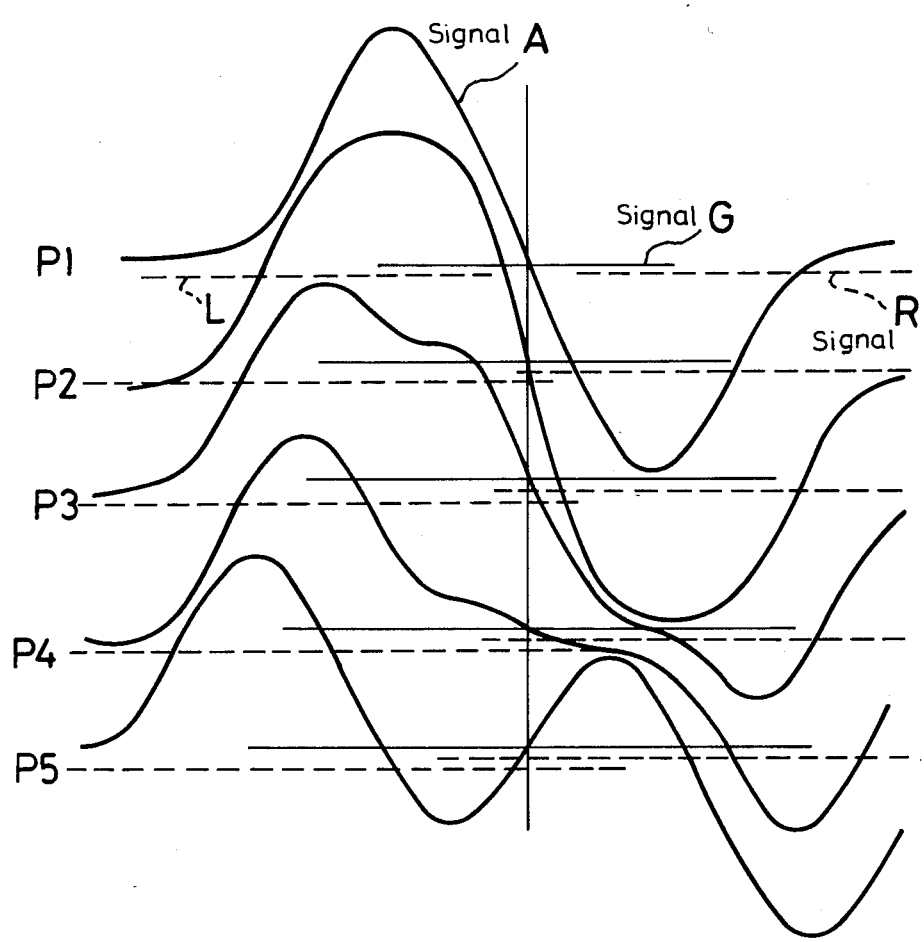
FIG. 16 is a diagram used to explain the branching control operation for the unmanned train.
Figure 17:
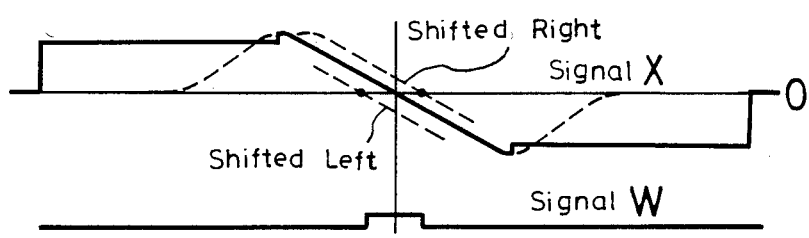
FIG. 17 is a diagram used to explain the principle of the branching control operation.

FIG. 16 is a graph graphing a relationship of four signal outputs A, G, L and R from the detector MD1 when the unmanned vehicle UT1 is not track-controlled and reaches to the positions P1, P2, P3, . . . , under the condition that the detector MD1 is attached to the unmanned vehicle UT1 with a distance of 30 mm from the floor or belt MB. While the analog signal A is not changed so much at the respective positions P1, P2 and P3, the above mentioned signal W is generated at portion in which the signals L and R are overlapping from the position P2. As the unmanned vehicle UT1 moves to the positions P3 and P4 from the position P2, the period of the signal W is widened. When the signal W is generated in the interface circuit IFC of the unmanned vehicle UT1, if a voltage of, for example, +1V is added to the analog signal X, the analog signal X is shifted upward and the intermediate point of the curve at which the voltage becomes zero is shifted right as shown in FIG. 17. Thus, the unmanned vehicle UT1 is shifted right in association therewith. When the unmanned vehicle UT1 is shifted right, the signal W is turned off and the signal X is returned to the original condition. As described above, according to the servo control operation, the unmanned vehicle UT1 is shifted from the center line along the right edge of the signal W and moved gradually to the right-hand side branching belt MB2. Similarly, when the signal W is turned on, if a voltage of, for example −1V is added to the signal X, the signal X is shifted left, allowing the unmanned vehicle UT1 to be shifted in the left-hand side of the branching belt MB1. In FIG. 15, a plurality of cross mark (X) points on the tracks or belts MB1 and MB2 represent the positions of the end portions of the signal W.

According to the second embodiment of the present invention, as described above, the following remarkable effects can be achieved, respectively.

Since the belt-shaped rubber magnet attached to the floor is used as the track for the unmanned vehicle and four output signals A, G, L and R from the detector are used as the control signals, it becomes possible to control the unmanned vehicle so as to be transported along the track accurately and smoothly without interruption.

Since the saturable coil of high sensitivity is used in the detector, the cross sectional area of the belt-shaped rubber magnet can be reduced ($50 \times 0.8$ mm$^2$ in this embodiment) and the track can be made at low cost.

Since this invention uses the magnetic track which can be prevented from being affected even by a floor made of a metal, the influence of smudges and an external light can be removed so that it becomes possible to construct the stable and positive guidance system for the unmanned vehicle.

Further, the magnetic detector of the invention can cover the width of about 300 mm and the guide control becomes possible within this range. Outside this range, the alarm signal can be generated. The above mentioned width can be changed freely by the designing.

Since the magnetic detector of the invention generates the analog output signal having the linear inclination and in which the voltage becomes zero at the central portion, the running condition of the unmanned vehicle can be controlled positively with high accuracy by the analog servo control operation.

Furthermore, both in the branching point or the joining point of the track, the unmanned vehicle can be shifted right or left arbitrarily without breaking the track of the belt-shaped magnet.

A further embodiment of the magnetic field generating substance according to the present invention will be described hereinafter.

Figure 18A:
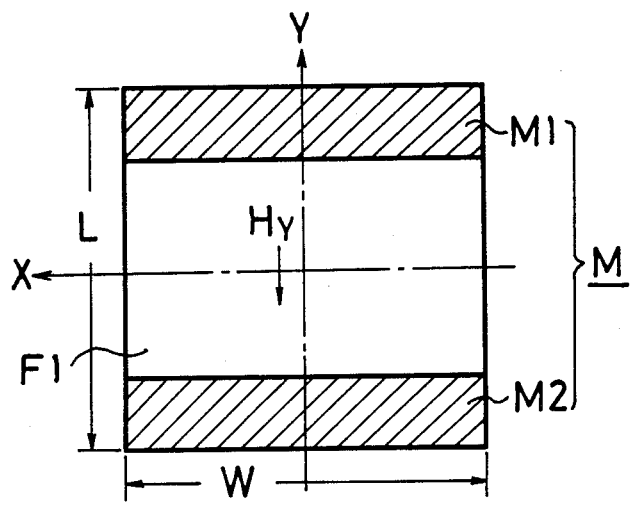
FIG. 18A is a plan view of an example of a magnetic field generating substance used in the present invention.
Figure 18B:
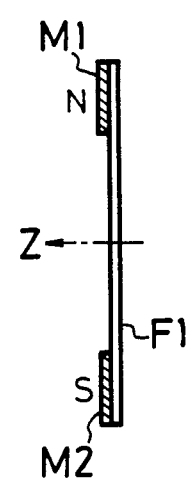
FIG. 18B is a side view of FIG. 18A.

FIG. 18A is a plan view illustrating another example of the magnetic field generating substance M used in the present invention and FIG. 18B is a side view thereof.

In this embodiment, as shown in FIGS. 18A and 18B, rectangular-shaped magnet members (for example, rubber magnets) M1 (N pole) and M2 (S pole) are attached respectively to both end edge portions of an iron plate or iron frame F1 in such a manner that the longitudinal directions of the magnet members M1 and M2 become vertical to the Y axis direction (or in the direction parallel to the X axis direction). In other words, the pair of magnet members M1 and M2 are located on the same plane in parallel to each other in an opposing relation to each other. In this case, the magnetic detector MD, which is movable in the X axis direction similarly to that shown in FIG. 1, detects a magnetic field $H_Y$ in the Y axis direction.

Figure 19:
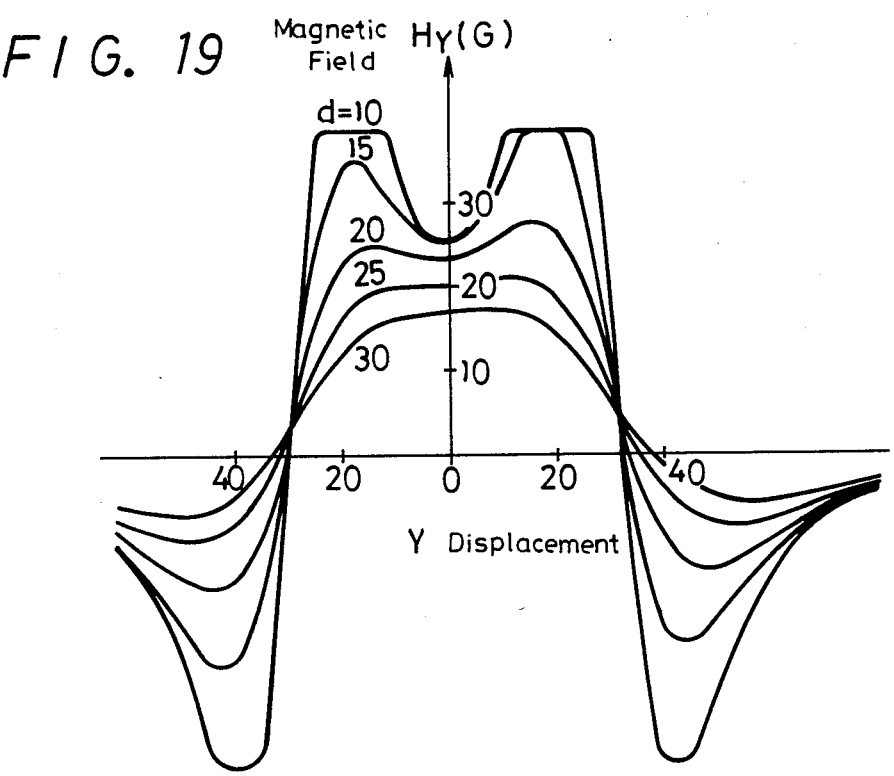
FIG. 19 is a graph graphing measured results of a magnetic field generated from the magnetic field generating substance shown in FIGS. 18A and 18B.

FIG. 19 is a graph graphing the measured results of the magnetic field $H_Y$ generated by the magnetic field generating substance M shown in FIG. 18. The magnetic field generating substance M used or magnet members M1 and M2 are each 80 mm long (length L) and 80 mm wide (width W) and the width of each of the magnet members M1 and M2 is 15 mm and the thickness thereof is 2 mm. The graph of FIG. 19 reveals that the change of the magnetic field $H_y$ is very small in a range where the displacement in the Y axis direction falls within $\pm 10$ mm and the distance d changes in a range from 10 mm to 25 mm. Now, let us consider the elevator, by way of example. Since the elevator is suspended by ropes, the elevator can not avoid the swinging in the horizontal plane (YZ plane). In this case, if the tolerance of the swinging in the Y and Z axis directions is selected to be $\pm 10$ mm, it is sufficient that the magnetic field $H_Y$ generated by the magnetic field generating substance M be substantially constant (invariable) in the range of $\pm 10$ mm.

Figure 20:
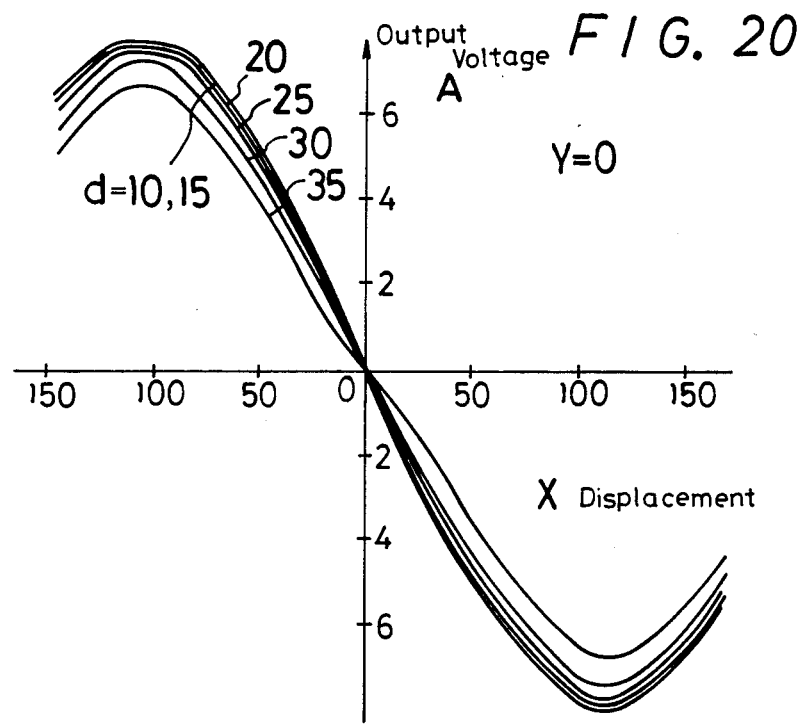
FIG. 20 is a graph graphing an output voltage characteristic from the magnetic detector of the invention.

FIG. 20 is a graph graphing an output voltage A from the magnetic detector MD and which is measured when the distance d is altered in a range of 10 mm to 25 mm where the displacement in the Y axis direction is zero. The graph of FIG. 20 reveals that the output voltage does not change substantially in a range where the distance d is changed from 10 mm to 25 mm.

Figure 21:
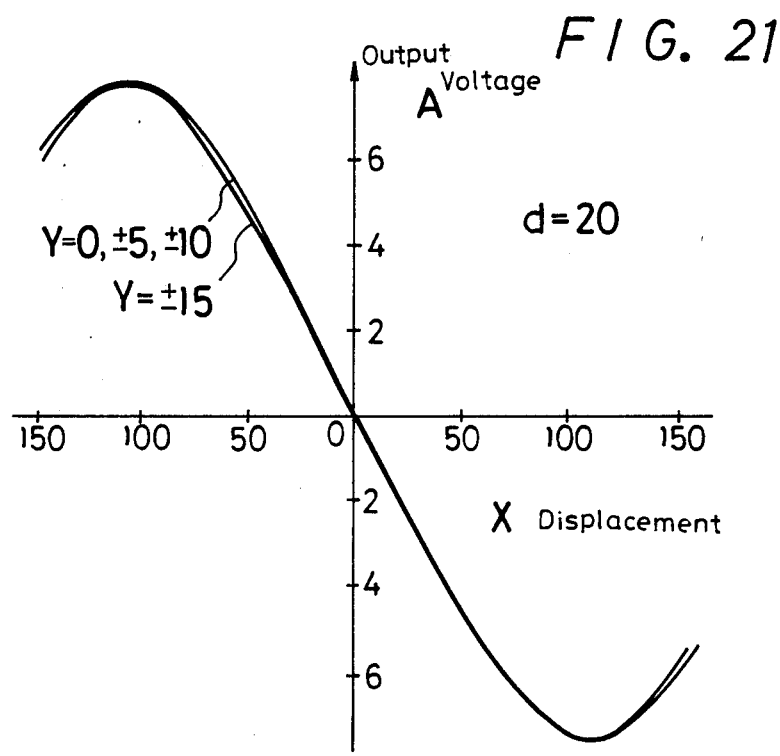
FIG. 21 is a like graph graphing an output voltage characteristic used to explain the invention.

FIG. 21 is a graph graphing an output voltage A from the detector MD and which is measured when the displacement in the Y axis direction is varied in a range from 0 to $\pm 15$ mm and the distance d is selected to be 20 mm (constant). From FIG. 21, it will be apparent that the output voltage A does not change substantially in this range. In other words, it will be appreciated that the magnetic field generating substance M in FIG. 18 can bring about the more improved effects.

While FIG. 18 illustrates the example of the magnetic field generating substance M in which the rubber magnets M1 and M2 are attached to the iron plate (or iron frame) F1, it is possible to use a plate (or frame) made of a non-magnetic material to wich the rubber magnets M1 and M2 are attached.

Figure 22A:
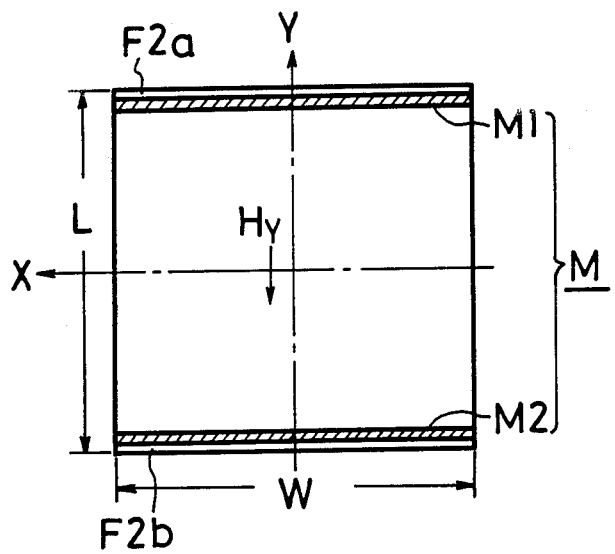
FIG. 22A is a plan view showing other example of the magnetic field generating substance used in the invention.
Figure 22B:
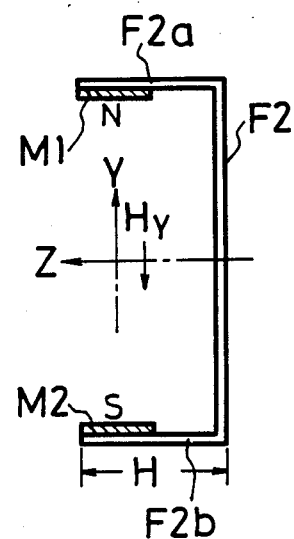
FIG. 22B is a side view of FIG. 22A.

FIG. 22A is a plan view illustrating other example of the magnetic field generating susbtance M used in this invention and FIG. 22B is a side view thereof. In this example, as shown in FIGS. 22A and 22B, the magnetic field generating substance M is formed such that the magnet members M1 (N-pole) and M2 (S-pole) similar to those in FIG. 18 are attached to an iron frame F2, that is formed as a fallen U-shaped frame in cross section, at its opposing arms F2a and F2b, respectively. Thus, the pair of magnet members M1 and M2 are located within the planes parallel to each other in an opposing relation to each other. Since in this example, the magnetic field generating substance M is formed in a three-dimensional way, it is difficult to handle as compared with the example of the magnetic field generating substance M which is located on the plane as shown in FIG. 18. However, the magnetic field generating substance M shown in FIG. 22 is superior to that in FIG. 18 from an efficiency standpoint.

Figure 23:
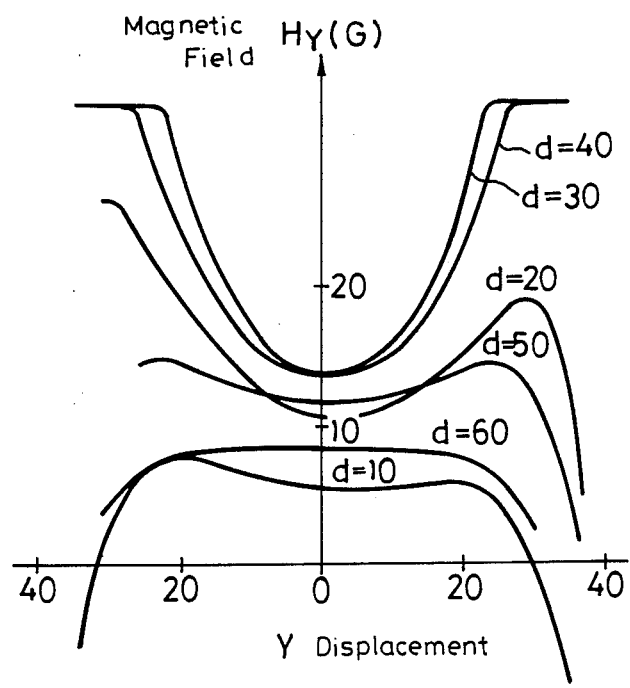
FIG. 23 is a graph graphing the condition of a magnetic field generated from the magnetic field generating substance shown in FIGS. 22A and 22B.

FIG. 23 is a graph graphing the state of the magnetic field $H_Y$ generated from the magnetic field generating substance M shown in FIG. 22. In that case, with respect to the dimension of this magnetic field generating substance M, the length L is selected as 100 mm, the width W as 80 mm, the height H of each of the arms F2a and F2b of the iron frame F2 as 40 mm and the width of each of the magnet members M1 and M2 in the Z axis direction as 15 mm.

Figure 24:
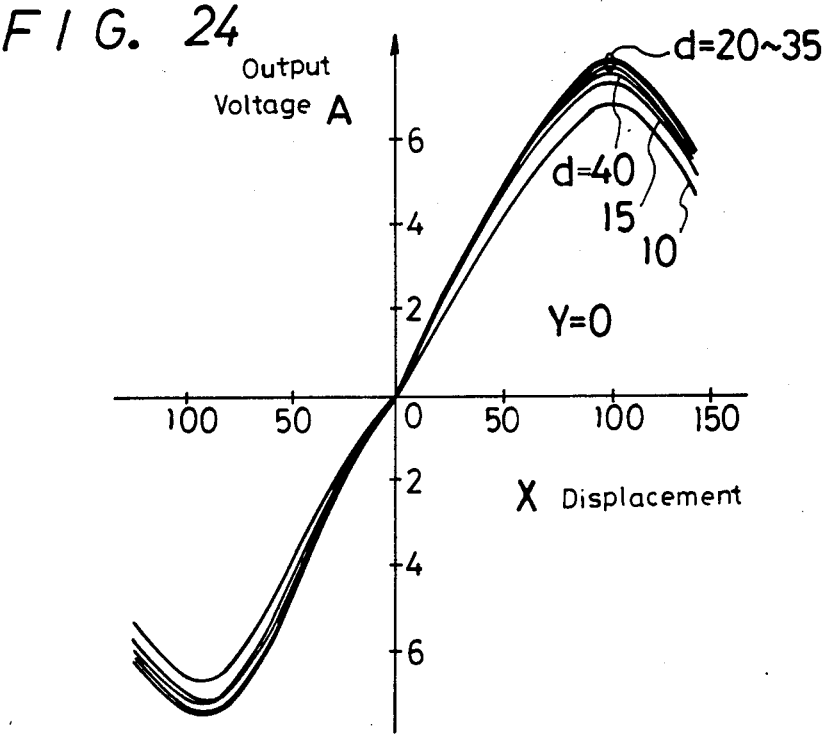
FIG. 24 is a graph showing a relationship between the positional displacement in the X axis direction and the output voltage.

FIG. 24 is a graph graphing the measured results of the output voltage A from the detector MD where the displacement in the Y axis direction is selected to be zero and the distance d is varied in a range from 10 mm to 40 mm. FIG. 24 reveals that the output voltage A does not change substantially in the range where the distance d is changed from 20 mm to 35 mm.

Figure 25:
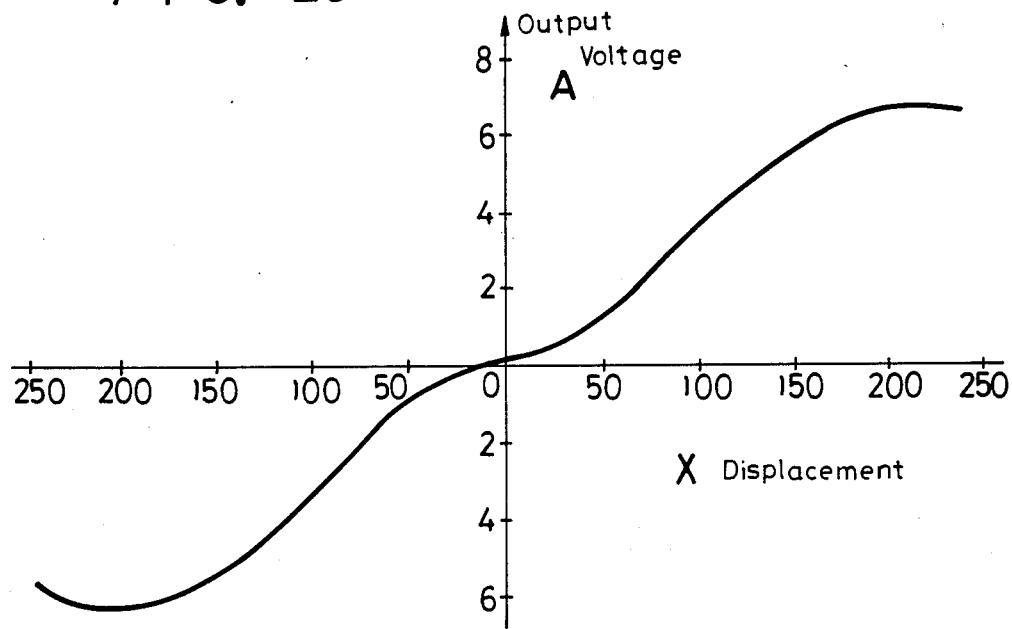
FIG. 25 is a graph graphing an output characteristic of a magnetic detector suited to control the stop position of an elevator.

FIG. 25 is a graph graphing an output characteristic of the magnetic detector MD and which is suitable to control the stop position of the elevator. As seen in FIG. 25, the output characteristic presents a shape that is slightly different from a straight line. While the four saturable coils L1 to L4 are provided in the detector MD shown in FIG. 1, if the number of the saturable coils is increased, an output voltage curve of a desired form can be obtained therefrom. In order to obtain the output characteristic over the length as shown in FIG. 25, a magnetic detector 500 m long must be provided. In this case, however, such magnetic detector 500 mm long can not be realized practically by four saturable coils without difficulty. Whereas, if 8 saturable coils are each paired into 4 pairs to form a magnetic detector, the satisfactory results could be obtained. In addition, the spacing or gap between the adjacent saturable coils is not limited to a constant one but may be smaller than the width of the magnetic field generating substance M.

According to the magnetic field generating substances shown in FIGS. 18 and 22 of the present invention, as set forth above, even when the positional displacement occurs in the direction perpendicular to the relative direction in which the magnetic detector is displaced from the magnetic field generating substance, the efficiency of the magnetic detector can be protected from a bad influence exerted by such positional displacement. Further, it is possible to obtain the output voltage shaped as a desired function form by increasing the number of the saturable coils. Thus, the magnetic detector of the invention is most suited as the position detector used to stop the unmanned vehicle such as the elevator which can not avoid the swinging in the up and down movement and whose control output is preferably the output characteristic curve slightly shifted from the straight line.

The above description is given on the preferred embodiments of the invention but it will be apparent that many modifications and variations could be effected by one skilled in the art without departing from the spirits or scope of the novel concepts of the invention so that the scope of the invention should be determined by the appended claims only.

I claim as my invention:

1. In an unmanned vehicle control system, a magnetic detector comprising:

(a) a magnetic field generating substance formed as a magnetic belt along which said unmanned vehicle is guided; and (b) magnetic detecting means formed of a plurality of aligned saturable coils, said magnetic detecting means comprising a magnetic sensor circuit including a plurality of said saturable coils and a plurality of switch circuits respectively connected to the saturable coils in said magnetic sensor circuit; each of said switch circuits being formed of three saturable coils supplied with an AC voltage from an AC voltage source, three rectifiers for rectifying the AC output from said three saturable coils to a DC voltage and an amplifier connected in common to the outputs of said three rectifiers; said magnetic detecting means being mounted on said unmanned vehicle so that said magnetic sensor circuit produces an analog output signal corresponding to a predetermined position of said unmanned vehicle relative to said magnetic belt having a linear inclination in its mid portion and said switch circuits produce an ON-OFF signal which becomes ON within the range substantially corresponding to said linear inclination portion of said analog output, and ON-OFF signals which both become ON when said analog signal is displaced to left or right sides of said linear inclination portion of said analog output.

2. The magnetic detector as claimed in claim 1, in which said magnetic field generating substance is formed of a pair of thin rectangular-shaped magnets which are attached to opposing end edges of a rectangular-shaped base plate in spaced parallel relationship to each other.

3. The magnetic detector as claimed in claim 2, in which said base plate is made of iron.

4. The magnetic detector as claimed in claim 2, in which said base plate is U-shaped in cross-section and said pair of magnets are respectively attached to the arms of said base plate in opposition to each other.

* * * * *